(12) United States Patent
Mehta et al.

(10) Patent No.: US 7,808,897 B1
(45) Date of Patent: Oct. 5, 2010

(54) FAST NETWORK SECURITY UTILIZING INTRUSION PREVENTION SYSTEMS

(75) Inventors: Neel Mehta, Dunwoody, GA (US); Robert David Graham, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 867 days.

(21) Appl. No.: 11/365,977

(22) Filed: Mar. 1, 2006

Related U.S. Application Data

(60) Provisional application No. 60/657,490, filed on Mar. 1, 2005, provisional application No. 60/772,430, filed on Feb. 10, 2006.

(51) Int. Cl.
*H04L 12/26* (2006.01)
*G06F 21/00* (2006.01)

(52) U.S. Cl. ............ 370/230; 726/13; 726/23; 713/154; 709/224

(58) Field of Classification Search ......... 370/392, 370/401, 230, 235; 726/22–25, 11–15; 709/24, 709/223–225; 713/150–154, 160–162, 169
See application file for complete search history.

(56) References Cited

U.S. PATENT DOCUMENTS

| | | | |
|---|---|---|---|
| 6,603,765 B1 * | 8/2003 | Wilford et al. ......... 370/395.32 |
| 7,007,299 B2 | 2/2006 | Ioele et al. | |
| 7,143,442 B2 | 11/2006 | Scarfe et al. | |
| 7,308,715 B2 | 12/2007 | Gupta et al. | |
| 7,356,585 B1 * | 4/2008 | Brook et al. ................. 709/224 |
| 7,441,262 B2 * | 10/2008 | Hui et al. ........................ 726/1 |
| 7,577,737 B2 * | 8/2009 | Fawcus ...................... 709/224 |
| 2002/0035683 A1 * | 3/2002 | Kaashoek et al. ............ 713/154 |

(Continued)

FOREIGN PATENT DOCUMENTS

WO          WO 00/10278          2/2000

(Continued)

OTHER PUBLICATIONS

"NetRanger User's Guide," Version 2.1.1, 1998, Cisco Systems, Inc., 336 pages. (See pp. 1-9, Shunning paragraph).

(Continued)

*Primary Examiner*—Aung S Moe
*Assistant Examiner*—Habte Mered
(74) *Attorney, Agent, or Firm*—King & Spalding LLP

(57) ABSTRACT

Intrusion Prevention Systems ("IPSs") are used to detect and/or prevent intrusion events from infiltrating a computer network. However, in large computer networks the IPSs cannot conduct their analysis on network data traffic quickly enough in the network core to meet the demand placed on them by the computer networks, thereby causing delays in the transmission of network data traffic from a source to a destination. To prevent this delay, the IPSs can be configured to intelligently communicate with a high-capacity network switch. The IPSs conduct the initial inspection of the network data traffic flows to determine if an intrusion event is present. However, after the initial inspection, the IPS can inform the switch of what actions to take for future traffic flows including determining which future traffic flows are inspected by the IPSs and which future traffic flows are allowed to be blocked or transmitted to their destination by the switch.

32 Claims, 11 Drawing Sheets

U.S. PATENT DOCUMENTS

| | | | |
|---|---|---|---|
| 2003/0041266 A1* | 2/2003 | Ke et al. ..................... 713/201 |
| 2003/0188189 A1 | 10/2003 | Desai et al. |
| 2004/0030927 A1* | 2/2004 | Zuk ........................... 713/201 |
| 2004/0250158 A1* | 12/2004 | Le Pennec et al. ............. 714/4 |
| 2004/0268147 A1 | 12/2004 | Wiederin et al. |
| 2005/0022022 A1* | 1/2005 | Mendonca et al. .......... 713/201 |
| 2006/0037075 A1* | 2/2006 | Frattura et al. ................ 726/22 |
| 2006/0053491 A1 | 3/2006 | Khuti et al. |
| 2006/0095968 A1* | 5/2006 | Portolani et al. .............. 726/23 |
| 2007/0002736 A1* | 1/2007 | Gade et al. .................. 370/230 |
| 2007/0192862 A1 | 8/2007 | Vermeulen et al. |

FOREIGN PATENT DOCUMENTS

WO    WO 02/101516    12/2002

OTHER PUBLICATIONS

Jou et al., "Architecture Design of a Scalable Intrusion Detection System for the Emerging Network Infrastructure," DARPA Order No. E296, Apr. 1997, pp. 42 pages. (See pp. 5 and 14-18, paragraphs 2.2.1.1-2.2.1.2 and 4.1.1-4.1.2.2).

"Realsecure™ Network Sensor User Guide," Version 5.0, 2000, Internet Security Systems, Inc., 42 pages. (See pp. 21-23, chapter 3).

Sugawara, "A Cooperative LAN Diagnostic and Observation Expert System," Ninth Annual International Phoenix Conference on Computers and Communications, Mar. 1990, 8 pages. (see pp. 667-669, sections 1-2).

Safford et al., "The TAMU Security Package: A Ongoing Response to Internet Intruders in an Academic Environment," Proceedings of the Fourth Usenix Security Symposium, Oct. 1993, 29 pages. (see pp. 102-106, section 4).

Sullivan et al., "Protecting Virtual Networks with a Distributed Cooperative Multi-Layer Security Architecture," WSEAS Transactions on Computers, Jan. 2006, vol. 5, No. 1, 8 pages. (See paragraphs 3.1, 3.4, 4.2).

* cited by examiner

FAST NETWORK SECURITY UTILIZING INTRUSION PREVENTION SYSTEMS

RELATED PATENT APPLICATION

Applicants claim priority under 35 U.S.C. §119 to U.S. Provisional Patent Application Ser. No. 60/657,490, entitled "Fast Flow Processing," filed on Mar. 1, 2005, and U.S. Provisional Patent Application Ser. No. 60/772,430, entitled "Fast Flow Processing," filed on Feb. 10, 2006. The complete disclosures of the above-identified provisional patent applications are hereby fully incorporated herein by reference.

FIELD OF THE INVENTION

The invention relates generally to computer systems and computer networks. More particularly, the invention relates to protection measures for computer networks from security violations using intrusion prevention systems at the network core.

BACKGROUND

In the conventional art, network security devices, such as Intrusion Prevention Systems ("IPS") are used to detect and prevent intrusion events from infiltrating a computer network. These existing network security devices can respond to unwanted network traffic, such as viruses and hacker attacks, by blocking packets or terminating connections between a source and a destination for network traffic.

The core of most large corporate networks typically operates at 100+ gigabit per second (GBPS) speeds. Therefore, in order to operate in these environments at the core, a network IPS must be able to scale or operate at comparable speeds. However, in the conventional art, it is technically very difficult to offer network intrusion protection at multi-ten-GBPS or 100-GBPS speeds with conventional hardware and software. As a matter of fact, conventional hardware capabilities of intrusion prevention make it impossible to provide protection capabilities at these speeds.

In the conventional art, IPS technologies can only offer protection at a small fraction of those speeds, typically less than 10 GBPS, causing corporations to have to create a diffuse protection architecture with a large number of IPS devices deployed outside the core of their network. This type of architecture is both complicated and costly, and typically results in a security sacrifice. The ability to provide protection directly in the network core allows both better and more cost-effective protection.

Accordingly, there remains a need for a method or system that can utilize IPS technology to protect internal networks at high speeds by enabling the IPS technology to be implemented and managed at a central point in the network core.

SUMMARY OF THE INVENTION

The invention satisfies the above-described and other needs by providing a system and method that can utilize IPS technology to protect internal networks at high speeds by enabling the IPS technology to be implemented and managed at a central point in the network core. Significantly, a switch can intelligently communicate with multiple IPS and determine whether to block packet flows, transmit the packet flows to their destination, or transmit the packet flows to an IPS for further analysis.

According to one aspect of the invention, a switch can receive a new packet and assign the packet to an IPS, utilizing a load balancing hashing algorithm. The IPS can conduct an analysis on the packet and determine whether the packet contains an intrusion event. The IPS can then transmit information related to the packet flow, such as a packet flow number, the source and destination IP address, the source and destination port address, the layer-4 protocol, the virtual local area network ("VLAN") tag, and an assigned IPS tag to the switch to store in a dynamic memory table. This information can allow the switch to identify subsequent packets that correspond to the packet that the IPS conducted the analysis on. Furthermore, the IPS can transmit an action response, or instruction, advising the switch of a particular action it should take if it identifies a packet that corresponds to the previously analyzed packet. These actions can include blocking the packet flow, transmitting the packet flow to its destination, or transmitting the packet flow to an IPS for further analysis.

For another aspect of the invention, the IPS can assign an interest priority value to each packet flow it analyzes which the switch stores in its dynamic memory table. Furthermore, the IPS can also assign a global interest priority value which it can adjust to prevent the switch from overloading the IPS with too many packets to analyze, which can significantly impair the transmission of packets to their destination.

For another aspect of the invention, the switch can monitor the ratio of packets transmitted to and received from the IPS in order to prevent overloading the IPS with too many packets to analyze, which can significantly impair the transmission of packets to their destination.

For another aspect of the invention, a switch, utilizing a load balancing hashing algorithm, can be implemented to equally distribute packet flows across multiple IPSs to allow the processing of an increased number of packet flows in a shorter amount of time. Furthermore, the load balancing hashing algorithm can be utilized when an IPS in the system fails or when an IPS becomes active.

These and other aspects, objects, and features of the present invention will become apparent from the following detailed description of the exemplary embodiments, read in conjunction with, and reference to, the accompanying drawings.

DETAILED DESCRIPTION OF EXEMPLARY EMBODIMENTS

Figure 1:
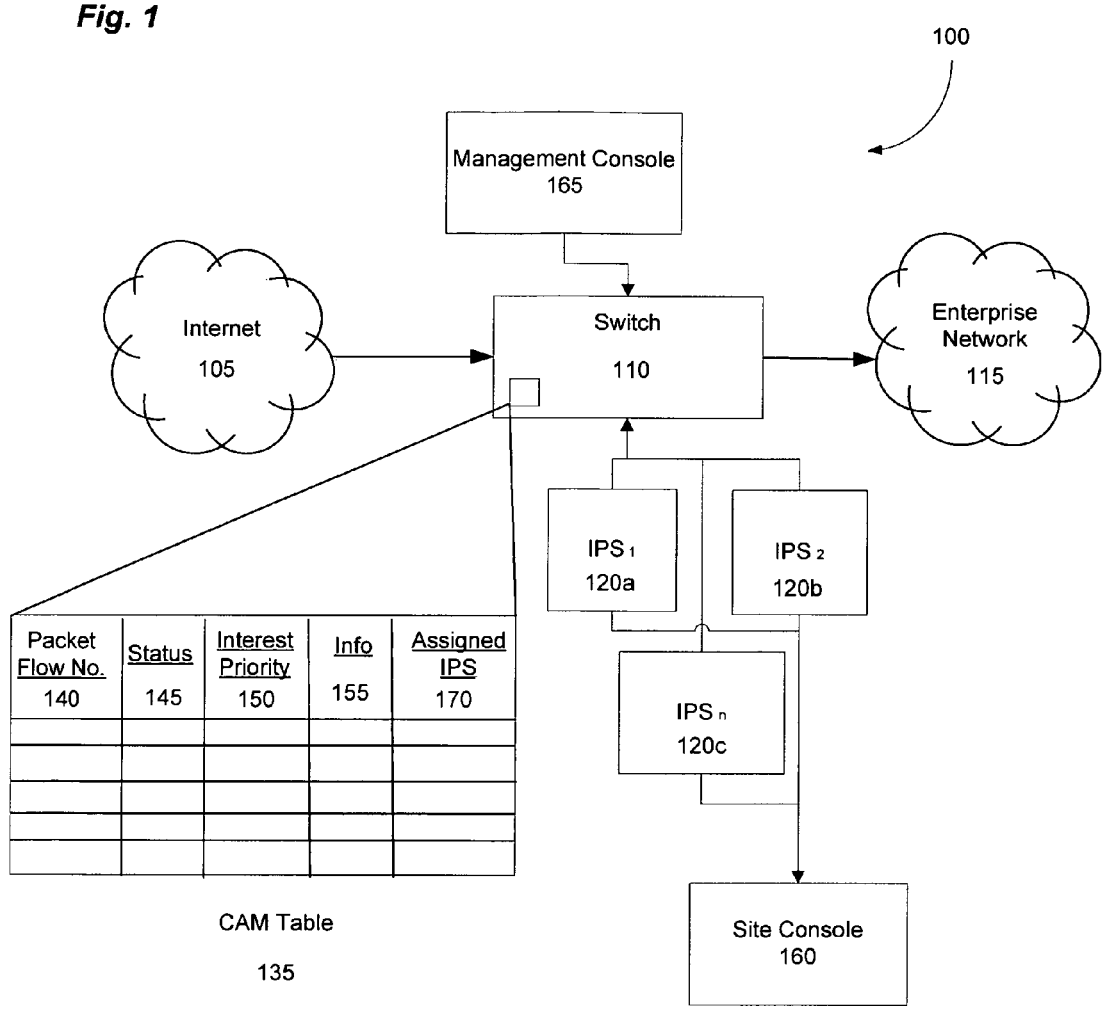
FIG. 1 is a block diagram illustrating an operating environment of various exemplary embodiments of the invention.

The invention utilizes Intrusion Prevention System (IPS) technology to protect internal networks at high speeds by enabling the IPS technology to intelligently communicate with a high-capacity network device at central point in the network core. Typically, IPSs are used to detect and prevent intrusion events from infiltrating a computer network by analyzing traffic flow data traffic on a per-flow basis to determine the presence of intrusion events. However, in large, high-capacity computer networks the conventional IPS cannot conduct its analysis on the network data traffic quickly enough to meet the demand placed on them by the computer networks because of both a matter of processing speed and bandwidth. The physical layer capacity of an IPS is typically not sufficient to transmit the amount of data traversing the typical network core; therefore, IPS are both incapable of processing network traffic quickly enough, and at high-enough capacity, to operate in the network core. Subsequently, this presents delays in the transmission of network data traffic from a source to a destination.

Therefore, to prevent this delay, the IPSs can be configured to intelligently communicate with a high-capacity network device, such as a switch. Initially, new data traffic flows are analyzed by the IPSs to determine if an intrusion event is present. Thereafter, an IPS can inform the switch of what actions to take for future traffic flows that correspond to the flows already analyzed by the IPS. Based on the initial analysis, the IPS can instruct the switch to forward some future traffic flows to the IPSs for a detailed analysis or for other future traffic flows the switch can be instructed to block or transmit the traffic flows to their destination.

The IPSs can also monitor themselves or be monitored by the switch to prevent the IPSs from becoming overloaded during intrusion detection analysis, which could lead to transmission delays. Furthermore, the switch can also be monitored to prevent congestion delays.

One of ordinary skill in the art will understand that in alternative exemplary embodiments, the switch discussed in the drawings may be substituted by a router, firewall, or other similar device that communicates network data traffic and can maintain a table of packet flow information in memory.

Referring now to the drawings, in which like numerals represent like elements, aspects of the exemplary embodiments will be described in connection with the drawing set. FIG. 1 is a block diagram of a system 100 comprising a switch 110 and one or more intrusion prevention systems 120, commonly referred to herein as IPS, operative to block, transmit, and analyze network traffic data. Initially, the switch 110 receives a new packet flow of network data traffic from the Internet 105. The switch 110 transmits a portion of the new packet flow to an IPS 120 that determines whether the switch 110 can block the remaining packets of the packet flow, transmit the remaining packets of the packet flow to their destination on an enterprise network 115, or send remaining packets of the packet flow to an IPS 120 to be analyzed for intrusion events. The IPS 120 determines what type of action to take in regards to the packet flows based on defined policies in the site console 160. In this exemplary embodiment, one site console 160 has the ability to manage many different IPS 120. Furthermore, a Management Console 165 is connected to the switch 110 and is operative to manage the configuration needed for the switch 110 and IPS 120 communicate and the day-to-day switch-specific functions not related to security. After an IPS 120 makes an initial determination about a packet flow, it sends that information back to the switch 110. The switch 110 maintains a content addressable memory ("CAM") table 135 capable of serving multiple access control lists ("ACL"). The ACLs maintained in the CAM table 135 contains information about the packet flow, including a packet flow identification number 140, packet flow information 155, a Status field 145, an Interest Priority field 150, and an assigned IPS field 170 for each packet flow that passes through the switch 110. The packet flow information 155 includes the source and destination IP address of the flow; the source and destination port of the flow; the layer 4 protocol (i.e. TCP, UDP, etc); the VLAN tag, which is an identifier that is important in identifying packet flows on more complex layered networks; and the action, determined by the IPS 120 based on information stored in the site console 160, that the switch 110 takes in response to receiving a packet flow.

As disclosed in FIG. 1, an exemplary embodiment of the present invention can have multiple IPS 120; thereby allowing the system 100 to process an increased number of packet flows in a shorter amount of time. To accommodate the increased number of IPS 120 the system 100 evenly distributes the packet flows with the switch 110, utilizing a load balancing hashing algorithm, among the IPS 120. An exemplary embodiment for evenly distributing the packet flows with the switch 110, utilizing a load balancing hashing algorithm, among the IPSs 120 will be discussed in more detail below with respect to FIG. 6.

Figure 2:
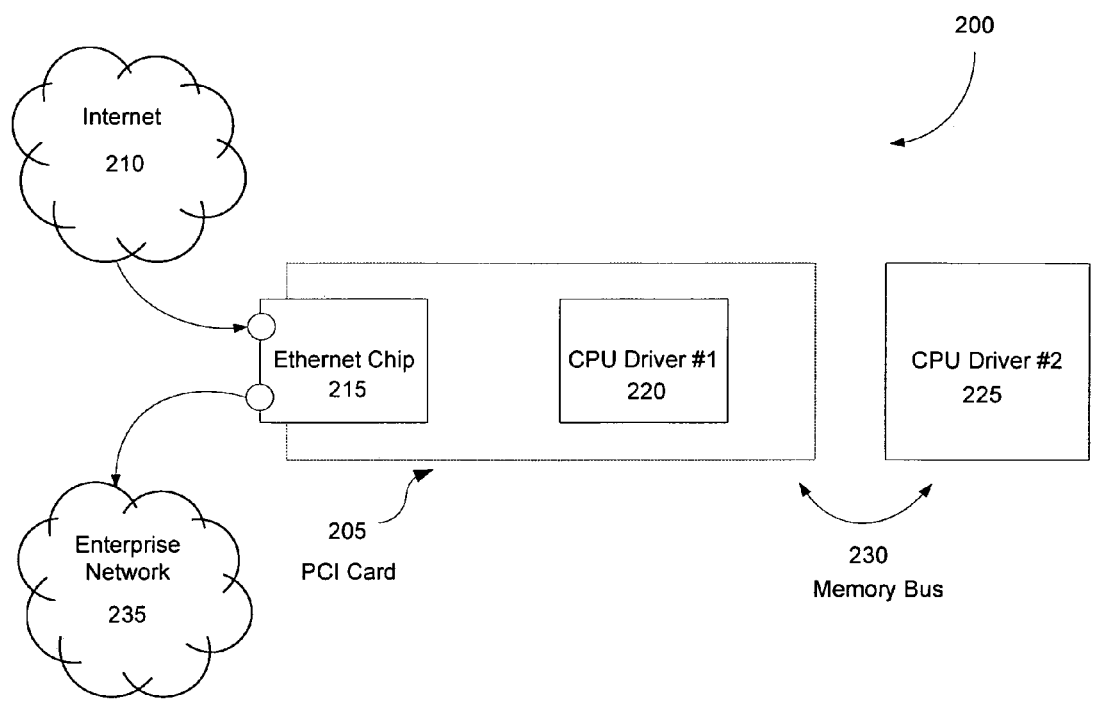
FIG. 2 is a block diagram illustrating an alternative operating environment for various exemplary embodiments of the invention.

FIG. 2 is a block diagram of an alternative exemplary system 200 comprising a Peripheral Component Interconnect (PCI) card 205 and a Central Processing Unit (CPU #2) 225 operative to block, transmit, and analyze network traffic data. The PCI card 205 comprises an Ethernet chip 215 and a CPU #1 220. The PCI card 205 receives packets of network data traffic from the Internet 210. The CPU #1 220 contains software that is operable to quickly analyze packet information by a technique such as pattern matching. One example of a pattern matching technique, known as Deterministic Finite Automata (DFA), searches the packet for a particular simple expression. If none of these expressions are detected, the software can immediately transmit that packet to its network destination without having to conduct a more extensive analysis of the packet. However, if one of the expressions is detected, the packet is transmitted to CPU #2 225 to undergo a more extensive analysis. The PCI card 205 and CPU #2 225 are connected via a memory bus 230. Furthermore, software on CPU #1 220 is programmable to allow the system 200 to forward traffic without intrusion detection when the system 200 becomes overloaded. While the system is overloaded, the software can determine which packet flows should be examined more closely by the IPS and which packet flows can be immediately forwarded to their network destination 235. This intelligent forwarding of packets can prevent a bottleneck of traffic from occurring as less packets will have to be forwarded to CPU #2 225 for a more detailed analysis.

The software located on CPU #2 225 is operative to perform a computationally intensive analysis for intrusion detection using a method such as Non-deterministic Finite Automata (NFA), a more comprehensive version of pattern matching, or protocol analysis. The downside of the software on CPU #2 225 is that the analysis performed is typically much slower than the analysis on CPU #1 220. However, the analysis is more likely to detect intrusion events. A more comprehensive version of pattern matching is performed by searching for more complicated regular expressions. Protocol analysis is performed by converting code to fit the data and then the data bytes cause transitions in a state machine. Protocol analysis has advantages over DFA/NFA in that it can test for non-exact matches and it can also skip bytes rather than process each byte one at a time. After packets undergo the more detailed analysis on CPU #2 225, the system 200 can transmit the non-harmful packets to their destination on an enterprise network 235 or block packets that contain intrusion events.

Figure 3:
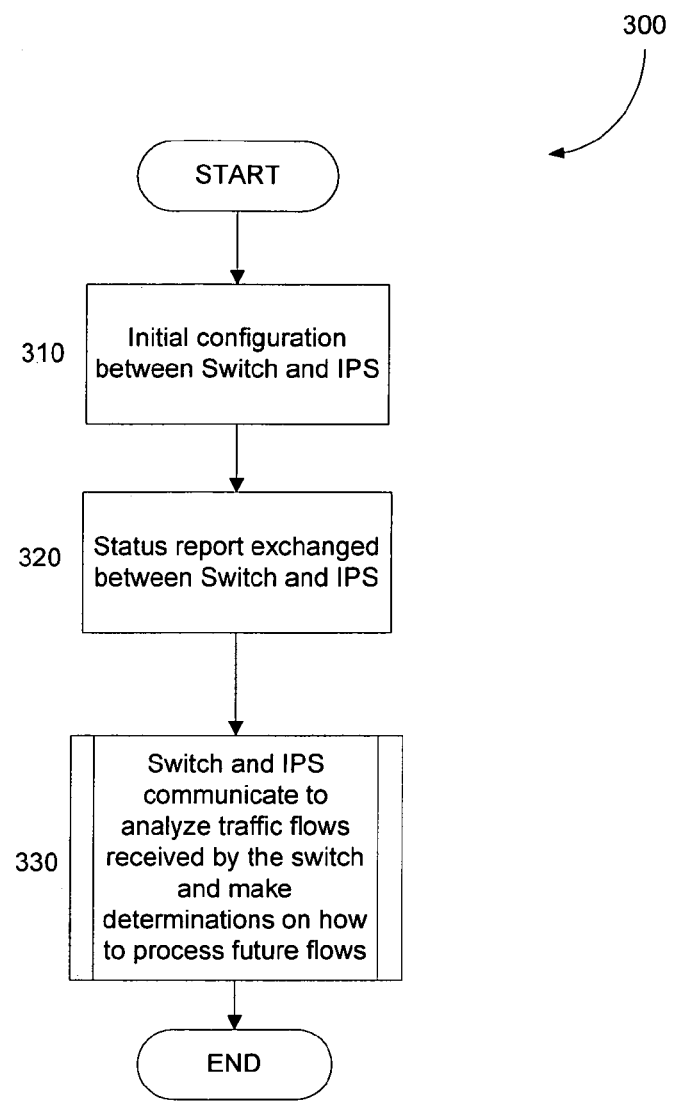
FIG. 3 is a flow chart illustrating a method for intelligent communications between a switch and IPS in an intrusion protection environment in accordance with an exemplary embodiment of the invention.

FIG. 3 is a flow chart illustrating an exemplary method for the intelligent communications between a switch and IPS in an intrusion protection environment in accordance with an exemplary embodiment of the invention. In Step 310, an initial configuration is conducted between the switch 110 and IPS 120. In the initial configuration between the switch 110 and IPS 120, the particular ports that are utilized in the communications between the devices are exchanged so the devices can locate each other. In Step 320, a status report is exchanged between the switch 110 and IPS 120. This status report step is conducted, preferably periodically, as the switch 110 and IPS 120 continue to communicate so the devices can be aware of whether the others are functioning properly. Therefore, if either the switch 110 or IPS 120 is not functioning properly, the other device can take an appropriate course of action until the disable device begins to function properly again. In Step 330, the switch 110 and IPS 120 communicate to analyze traffic flows received by the switch 110 and make determinations on how to process future packet flows.

Figure 4:
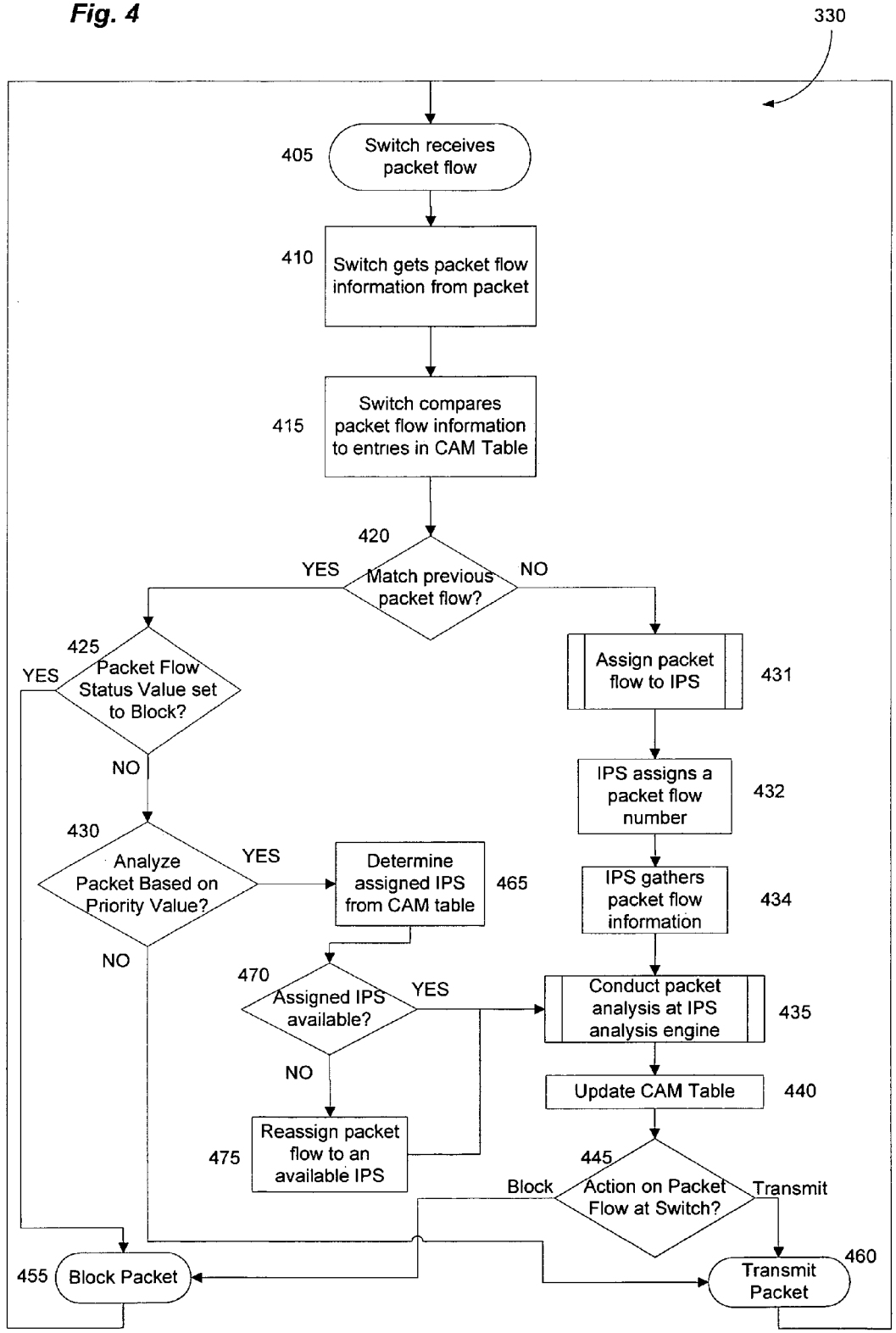
FIG. 4 is a flow chart illustrating a method for processing network data traffic by analyzing packet information and determining when to block or transmit packet flows in accordance with an exemplary embodiment of the invention.

FIG. 4 is a flow chart depicting an exemplary method 330 for processing network data traffic by analyzing packet information and determining when to block or transmit packet flows. Packet flows are groups of a multitude of individual packets that share the same packet flow information. The packet flow information 155 typically comprises the source IP address, source port, destination IP address, destination port, the layer-4 protocol (i.e. Transport Control Protocol (TCP) or User Datagram Protocol (UDP)), and the VLAN tag. Therefore, after analyzing only a fraction of the individual packets, the exemplary method 330 can typically decide whether to block or transmit the entire packet flow without analyzing additional packets in that particular flow.

In Step 405, a switch receives a portion of a packet flow from the network data traffic. In Step 410, the switch 110 gets packet flow information 155 from the packet. In Step 415, the packet flow information 155 is compared to information in a CAM table 135 maintained at the switch 110 to determine what type of action must be taken for that particular packet flow. The switch 110 maintains a CAM table 135 in memory that consists of various ACLs of packet flows that have already passed through the switch 110. The CAM table 135 comprises information for previously received packet flows including a packet flow number 140, a Status field 145, an Interest Priority field 150, packet flow information 155, and an assigned IPS field 170. One of ordinary skill in the art will understand that references to an IPS 120 could include any of the IPS 120 connected to the switch 110.

In Step 420, the switch 110 determines whether the packet flow information 155 of the current packet matches a previous packet flow in the CAM table 135. In Step 420, if no match is found in the CAM table 135, which most likely indicates a new packet flow, the packet is transmitted to an IPS 120 to be analyzed. First, in Step 431, the switch 110 assigns the packet flow to an IPS 120 to be analyzed utilizing a load balancing hashing algorithm, which is implemented on the switch 110. An exemplary embodiment for evenly distributing the packet flows with the switch 110, utilizing a load balancing hashing algorithm, among the IPSs 120 will be discussed in more detail below with respect to FIG. 6. A unique identifier identifying the assigned IPS 120 is then stored in the CAM Table 135 on the switch 110 in the assigned IPS column 170.

Next, the IPS 120 assigns a packet flow number 140 to the packet in Step 432. Next, in Step 434 IPS 120 gathers the packet flow information 155 for the packet including the source IP address, source port, destination IP address, destination port, the layer-4 protocol (i.e. Transport Control Protocol (TCP) or User Datagram Protocol (UDP)), and the VLAN tag. The packet flow information 155 can later be used to identify subsequent packets that are part of the same packet flow.

In Step 435, the packet is analyzed by an IPS analysis engine which in turn returns a flow qualification message that contains the packet flow number 140, packet flow information 155, including the source and destination IP address, the source and destination port, the layer-4 protocol (TCP/UDP), the VLAN tag; a status value 145; and a Interest Priority value 150 to the switch 110 for storage in the CAM table 135. The purpose of the flow qualification message is to update the information stored in the CAM table 135 associated with a particular packet flow. Updating the information stored in the CAM table 135 associated with a particular packet flow allows the switch 110 to maintain current information relating to the packet flows in order to identify packet flows as they are received at the switch 110 and make a determination as to what action to take with respect to that particular packet flow. One of ordinary skill in the art will understand that in a network intrusion detection environment, there will potentially be many new packet flows being received by the switch 110 and transmitted to the IPS 120. Therefore, because of the potentially large number of new packet flows, the IPS 120 may batch information about multiple packet flows into one flow qualification message to be sent back to the switch 110 after the IPS 120 conducts its analysis.

The Status value 145 indicates whether a packet flow should be blocked. For illustrative purposes, the value of 1 in the Status field 145 could indicate the packet flow should be blocked, while a value of 0 could indicate the packet flow should not be blocked. The Status value 145 is a quick way for the switch 110 to determine what action to take with respect to a packet flow. The Interest Priority value 150 is useful in improving the performance of the system 100 during high volume packet flow situations. The Interest Priority value 150 can be utilized as an "in between" state instead of just classifying the packet flows as "good" whereby they will be transmitted to their destination, or "bad" whereby the packet flow is immediately blocked at the switch 110. For illustrative purposes, the values of the Interest Priority field 150 may be in the range from 0-10 with 10 representing the highest Interest Priority and 1 representing the lowest Interest Priority. A value of 0 in the Interest Priority field 150 could indicate that the packet flow should be blocked; therefore the Interest Priority would be irrelevant.

In conjunction with the Interest priority value 150, the switch 110 can maintain in memory a Global Interest Priority value, which is a variable that defines the threshold for determining when the switch 110 decides whether to transmit the packets or send them to the IPS 120 for analysis. The Global Interest Priority value is useful in preventing the IPS 120 from becoming too congested to handle the network data traffic or allowing the IPS 120 to receive more network data traffic to be analyzed. The Global Interested Priority Value is used in conjunction with the Interest Priority Value 150 of a particular packet flow as one way to determine which packet flows should be analyzed by an IPS 120. Typically, the default value for the Global Interest Priority is set to 5. Therefore, packet flows with Interest priority values greater than the Global Interest Priority value will be forwarded by the switch 110 to the IPS 120 for analysis. A discussion of utilizing the Global Interest Priority value for the purposes of preventing IPS congestion will be discussed in more detail below in regards to FIGS. 7 and 8.

In Step 440, the switch 110 receives the flow qualification message from the IPS 120 and updates the CAM table 135 to reflect the new values. Subsequently the switch 110 receives the packet flow that was analyzed by the IPS 120. In Step 445, the switch 110 determines the appropriate action to take on the packet received from the IPS 120. If the IPS 120 determined that the packet should be blocked in Step 435 by setting the status field 145 to 1 for the corresponding packet flow, the packet is immediately blocked in Step 455. If the IPS determined that the packet should not be immediately blocked in Step 435 by setting the status field 145 to 0 for the corresponding packet flow, the switch 110 will transmit the packet to its destination in Step 460.

Returning to Step 420, if there is a match to a previously received packet flow, the switch 110 checks the value of the Status field 145 corresponding to that particular packet flow in the CAM table 135 in Step 425. If the Status field 145 indicates the packet flow should be blocked, the packet is immediately blocked in Step 455. However, if the status field does not indicate the packet flow should be blocked, in Step 430 the switch 110 compares the value of the Interest Priority field 150 corresponding to the packet flow in the CAM table 135 and the Global Interest Priority value. By comparing these values, the switch 110 can immediately transmit the packet to its network destination 115 in Step 460 or allow the packet to be passed to the IPS 120 for analysis in Step 435. If the Interest Priority field 150 for a packet flow is less than the Global Interest Priority value, that packet flow can be transmitted by the switch 110 to its destination on the network 115 in Step 460. Furthermore, the status field 145 in the CAM table 135 corresponding to the packet flow may indicate a particular action to associate with this packet flow such as blocking the packet in Step 455, transmitting the packet to its destination in Step 460, or transmitting the packet to the IPS 120 for further analysis in Step 435.

However, if the Interest Priority value 150 for a packet flow is greater than or equal to the Global Interest Priority value, the switch 110 will transmit the packet to be analyzed by the IPS 120 in Step 435. For example, if the packet flow has an Interest Priority value of 7 and the Global Interest Priority Value is 6; this particular packet, and other packet flows with Interest Priority Values of 6 and higher will be transmitted to the IPS 120 for analysis. In this case, the switch 110 will first check the assigned IPS field 170 in the CAM table 135 associated with the current packet flow to determine which IPS 120 the packet flow should be transmitted to in Step 465. Next, in Step 470, the switch will determine whether the assigned IPS 120 is still available or whether the assigned IPS 120 has failed. As discussed in Step 320, the switch 110 and IPS 120 exchange status reports periodically so the devices can be aware of whether the others are functioning properly. If the assigned IPS 120 is still available to perform analysis in Step 470, the packet flow will be transmitted to the assigned IPS 120 for packet analysis by the IPS analysis engine in Step 435. Otherwise, if the assigned IPS 120 is not available, the packet flow will be reassigned to an available IPS 120 in Step 475. An exemplary method for assigning packet flows to an IPS 120 is discussed in FIG. 6. After the packet flow is assigned to an IPS 120 in Step 475, the assigned IPS field 170 will be updated on the CAM Table 135 on the switch 110, and the packet flow will be transmitted to that assigned IPS 120 for packet analysis by the IPS analysis engine in Step 435.

After the packet is analyzed by the IPS 120 in Step 435, the CAM table 135 is updated in Step 440 based on the flow qualification message received from the IPS 120. Because this particular packet flow is not a new packet flow, it will not be necessary for the qualification message to contain all of the information about the packet flow. Therefore, the qualification message will contain the packet flow number 140, which uniquely identifies the packet flow, and any additional information that has changed after the analysis by the IPS 120 in Step 435, such as the status value 145 and/or Interest priority value 150. Subsequently, the switch 110 can either block the packet in Step 455 or transmit the packet to its destination on the network 115 in Step 460 based on the updated status value 145 received in the qualification message from the IPS 120.

Figure 5:
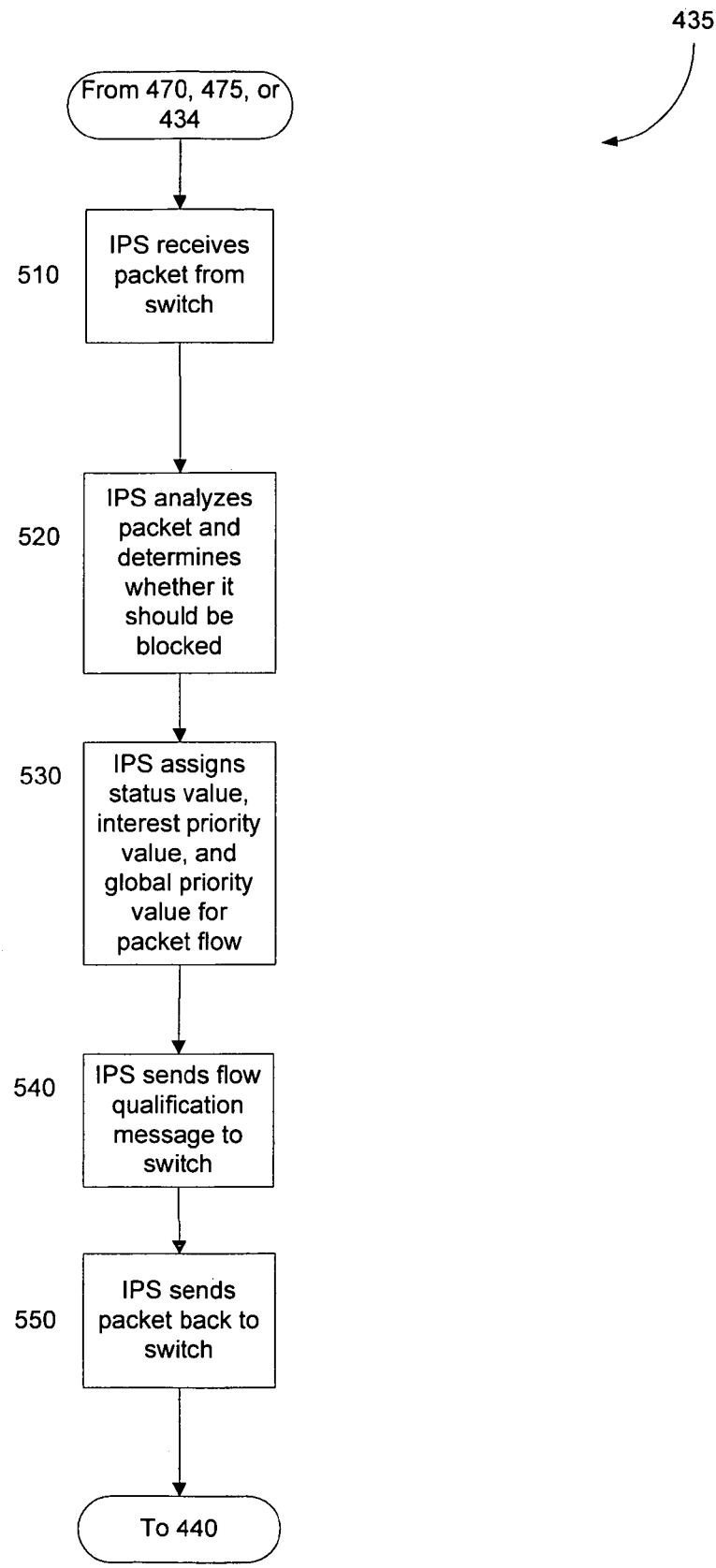
FIG. 5 is a flow chart depicting a method for conducting packet analysis at an IPS analysis engine in accordance with an exemplary embodiment of the invention.

FIG. 5 is a flow chart depicting an exemplary method 435 for conducting packet analysis at an IPS 120 analysis engine. In Step 510, the IPS 120 receives the packet from the switch 110 to be analyzed. In Step 520, the IPS 120 analyzes the packet to detect any intrusion events and determines whether the packet, and subsequently, the rest of its flow should be blocked. One of ordinary skill in the art should understand that the function of an IPS 120 in conducting intrusion event detection is well known in art. Therefore, IPS 120 can be configured in many different ways to conduct packet analysis and respond to intrusion events. In an exemplary embodiment, the site console 160 contains particular policy protocols the IPS 120 follows in response to detecting particular intrusion events. The site console 160 policy protocols can define whether a packet flow should be blocked and/or define what interest priority value should be assigned to a particular flow.

In one example, an IPS 120 can detect that many packet flows are all originating at the same source. Therefore, the IPS 120 can determine that this source is a particularly "bad offender" after it detects multiple security events from that source. However, for this "bad offender" scenario, a large amount of space can be occupied in the CAM table 135 because although the source is the same for all the packet flows, the destination is different; therefore, there is a separate ACL occupied in the CAM table 135 for each packet flow. Therefore, in response, the IPS 120 must first inform the switch on how to identify the "bad offender." Next, the IPS 120 has the option of informing the switch 110 to block all future packet flows from that "bad offender" source by setting the status value to 1, or the IPS 120 can inform the switch 110 to transmit all future packet flows from that "bad offender" source to the IPS 120 for a detailed analysis.

If the IPS 120 determines that the packet should be blocked, the IPS 120 sets the Status value 145 to 1 for the packet flow corresponding to the packet in Step 530. Furthermore, in Step 530, the IPS 120 sets an Interest Priority value 150 and a Global Priority value for the packet flow. If the IPS 120 determines that the packet flow should be blocked in Step 520, the Interest Priority value 150 is set to 0 for the packet flow corresponding to the packet. Otherwise, the IPS 120 can set the Interest Priority value 150 in a range from 1-10. One of ordinary skill in the art should understand that the Interest Priority values are configurable by the user of the system or they are based on particular security event protocols as defined by the cite console 160.

Typically, the IPS 120 will initially set the Interest Priority Value for a packet flow at a default value of 5. However, the IPS 120 is operative to recognize that the current packet flow is similar to previous packet flows based on the type of information in the packet and other information such as the same IP source address. Therefore, the IPS 120 can determine that a packet flow from the same address that has been sending out hostile packets should be given an elevated Interest Priority value to ensure that the future packets of the packet flow will be analyzed by the PS 120. In Step 540, the IPS 120 returns a flow qualification message including the packet flow number 140, the packet flow information 155, the status value 145, and Interest Priority value 150 to the switch 110 for storage in the CAM table 135. Finally, in Step 550, the IPS 120 transmits the packet flow back to the switch 110.

Figure 6:
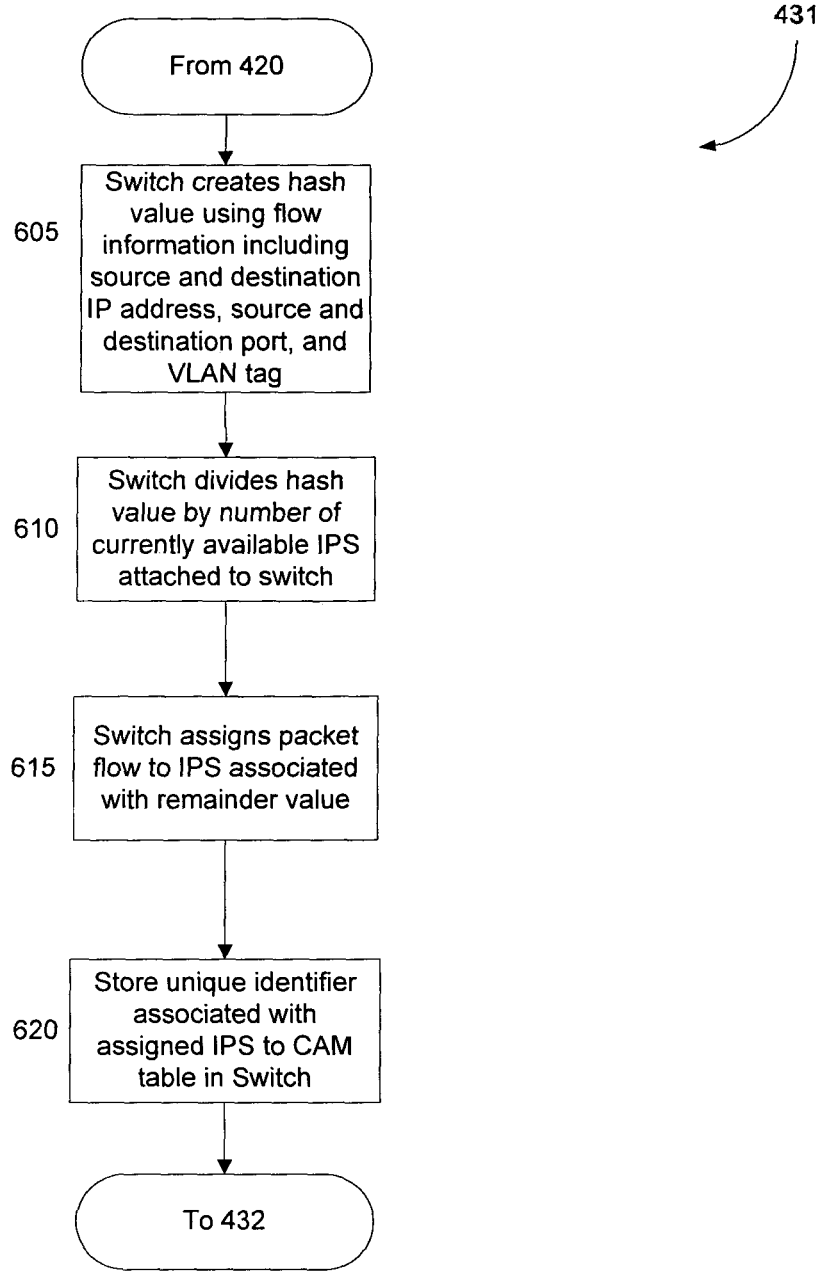
FIG. 6 is a flow chart depicting a method for evenly distributing packet flows with a switch, utilizing a load balancing hashing algorithm, among one or more IPS analysis engines in accordance with an exemplary embodiment of the invention.

FIG. 6 is a flow chart depicting a method for evenly distributing packet flows with a switch, utilizing a load balancing hashing algorithm, among one or more IPS analysis engines in accordance with an exemplary embodiment of the invention. The switch 110, utilizing the load balancing hashing algorithm implemented on the switch 110, routes each packet flow to a particular IPS 120 which increases the processing time of each packet flow. Furthermore, this configuration prevents multiple IPSs 120 from conducting a new packet flow analysis for the same packet flow.

In Step 605, the switch 110 creates a hash value to uniquely identify the packet flow received at the switch 110. The switch 110 utilizes the packet flow information 155 of the packet flow including the source and destination IP address, source and destination port, and VLAN tag to create the hash value. One of ordinary skill in the art will understand that hashing algorithms are well known in the art and many different types of hashing algorithms, including publicly available algorithms, may be utilized to create a hash value from the packet flow information 155 of the packet flow. The load balancing hashing algorithm in the exemplary embodiment has the characteristics of equally assigning packet flows, which the switch 110 subsequently distributes to the IPS 120 in the system 100. Therefore, the load balancing hashing algorithm has a low hash collision which means it will avoid unevenly distributing packet flows across the same hash space. One example of the publicly available hashing algorithm that could be utilized is the Secure Hash Algorithm, Version 1.0 ("SHA-1") that is a publicly available and open hashing standard. Source code for SHA-1 is available for free via the World Wide Web.

In Step 610, the hash value created in Step 605 is divided by the number of currently IPS 120 attached to the switch 110 that are available to receive packets for analysis. As discussed in Step 320, a status report is exchanged periodically between the switch 110 and IPS 120 in the system so the devices can be aware of whether the others are functioning properly. In Step 615, the switch 110 will utilize the remainder of the value of Step 610 to assign a particular IPS system 120 to the current packet flow. For example only, if the hash value is 5 and there are currently four available IPSs 120, the remainder value would be 1. Therefore, a particular IPS 120 with a unique identifier will be assigned by the switch 110 for each remainder value. In this example, the particular IPS 120 associated with the remainder value of 1 will be designated as the assigned IPS 120 by the switch 110 for this particular packet flow. In Step 620, the unique identifier associated with the assigned IPS 120 will be stored in the CAM table 135 on the switch 110.

One potential problem that the system 100 may face is that IPS 120 can become too congested to handle the network data traffic that is being transmitted. Furthermore, In an exemplary embodiment of the invention, the switch 110 or IPS 120 can monitor the capacity of the IPS 120 and determine whether the IPS 120 has the ability to handle more network data traffic or whether the IPS 120 is becoming too overloaded.

Figure 7:
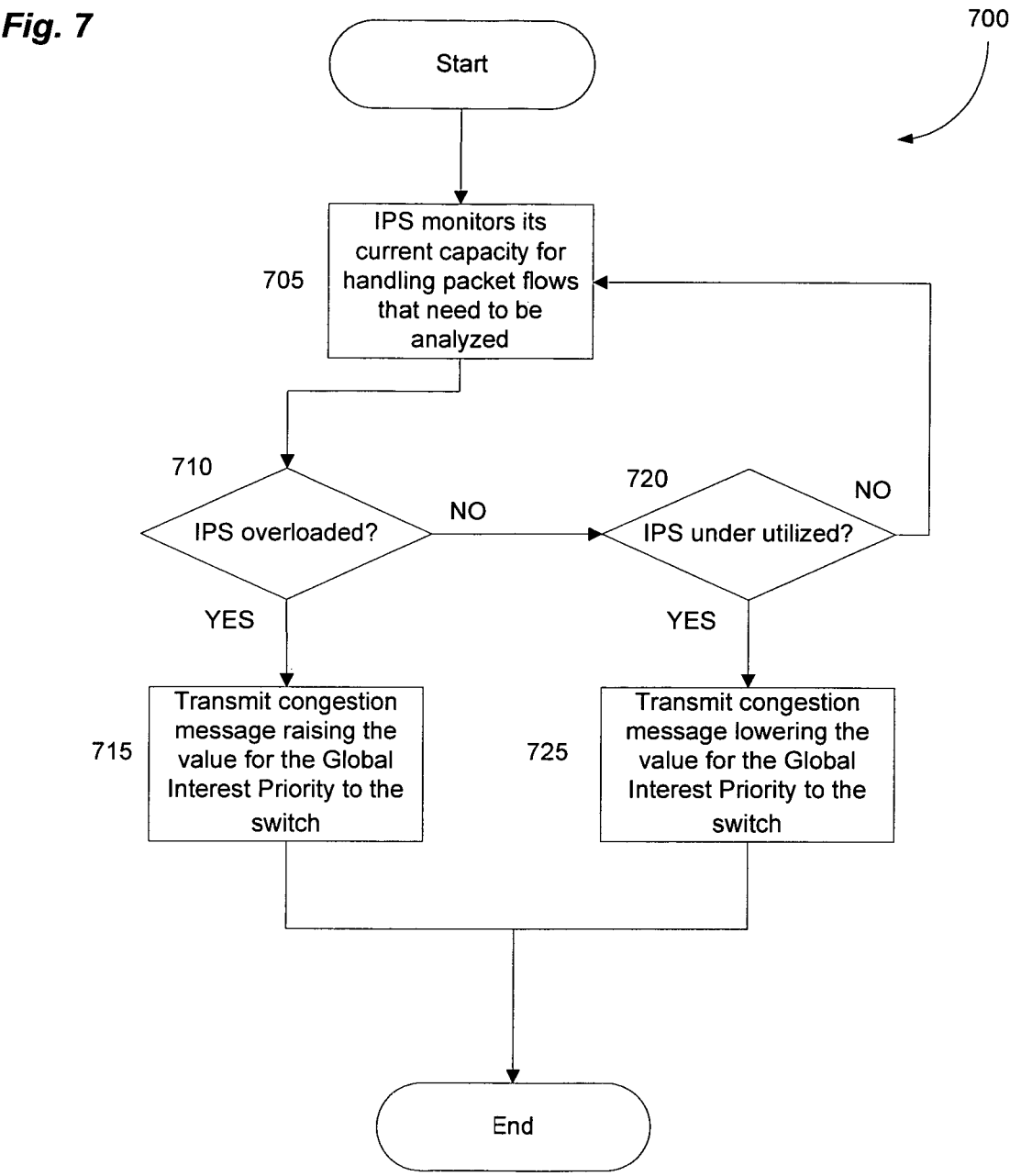
FIG. 7 is a flow chart depicting a method for an IPS to monitor and adjust that amount of network data traffic that is being received from a switch in accordance with an exemplary embodiment of the invention.

FIG. 7 is a flow chart depicting a method 700 for an IPS 120 to monitor and adjust that amount of network data traffic that is being received from a switch in accordance with an exemplary embodiment of the invention. First, in Step 705, the IPS 120 monitors its current capacity for handling the analysis of network data traffic. In Step 710, the IPS determines whether its current capacity exceeds a certain threshold that indicates the IPS is overloaded. The threshold value can be a predefined value based many different factors including the specifications of the TS 120 in the system 100, historical information about IPS 120 capacity, or other values contemplated by the operator of the system 100.

If the IPS 120 determines its current capacity does exceed a certain threshold it will transmit a congestion message raising the value for the Global Interest Priority Value to the switch 110 in Step 715. The congestion message alerts the switch 110 that the IPS 120 is becoming overloaded and includes the new value for the Global Interest Priority Value. As previously discussed, the Global Interest Priority Value is a variable that defines the threshold for determining when the switch 110 decides whether to transmit the packets or send them to the IPS 120 for analysis.

Returning to Step 710, if the IPS 120 determines its current capacity does not exceed a certain threshold, then in Step 720, the IPS 120 will determine if its current capacity is less than a certain threshold. As discussed above, the threshold can be a predefined value, but in this case indicating that the IPS 120 has the ability to handle more network data traffic. If the IPS 120 determines that its current capacity is not less than a certain threshold in Step 720, the IPS 120 will continue to monitor its current capacity in Step 705. However, if in Step 720, the IPS 120 determines that its current capacity is less than a certain threshold, it will transmit a congestion message lowering the value for the Global Interest Priority to the switch 110 in Step 725.

For example only, the threshold capacity for determining when an IPS 120 is becoming overloaded could be 70%. Therefore, if the level of network data traffic being analyzed by the IPS 120 exceeds 60% of the capacity of the IPS 120, then the IPS 120 transmits a congestion message to the switch 110 to increase the Global Interest Priority value to avoid overloading the IPS 120. Therefore, if the Global Interest Priority Value is raised to 7, then all packet flows with Interest Priority values less than 7 will be forwarded to their destination without undergoing an analysis by the IPS 120. On the other hand, if the level of traffic falls below 30%, then the IPS 120 transmits the congestion message to the switch 110 to decrease the Global Interest Priority value in order to allow more traffic to be analyzed by the IPS 120.

Figure 8:
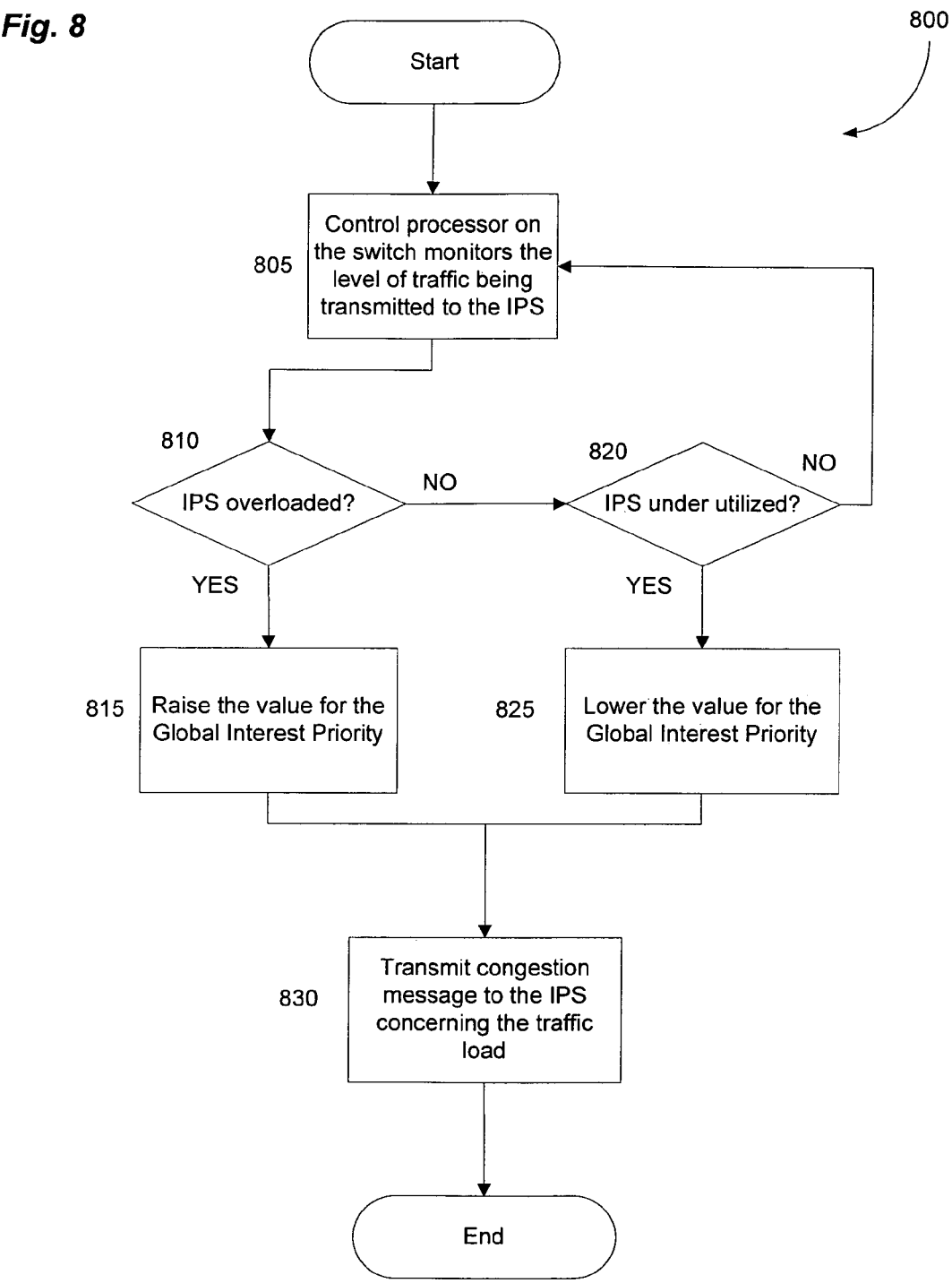
FIG. 8 is a flow chart depicting a method for a switch to monitor and adjust that amount of network data traffic that is being received by an IPS from a switch in accordance with an exemplary embodiment of the invention.

FIG. 8 is a flow chart depicting a method for a switch to monitor and adjust that amount of network data traffic that is being received by an IPS from a switch in accordance with an exemplary embodiment of the invention. First, in Step 805, a control processor on the switch 110 can monitor the level of traffic being passed to the IPS 120 for analysis on a periodic basis. The switch 110 determines the IPS' 120 capacity for handling more network data traffic based on a ratio of the number of packets sent by the switch 110 to the IPS 120 versus the number of packets transmitted by the IPS 120 back to the switch 110. In Step 810, the switch 110 determines whether the current capacity of the IPS 120, determined by the ratio, exceeds a certain threshold that indicates the IPS is overloaded. The threshold value can be a predefined value based many different factors including the specifications of the IPS 120 in the system 100, historical information about IPS 120 capacity, or other values contemplated by the operator of the system 100.

If the switch 110 determines the current capacity of the IPS 120 does exceed a certain threshold it will raise the value of the Global Interest Priority in Step 815. As previously discussed, the Global Interest Priority is a variable that defines the threshold for determining when the switch 110 decides whether to transmit the packets or send them to the IPS 120 for analysis. Subsequently, the switch 110 will also transmit a congestion message to the IPS 120 concerning the change in the traffic load in Step 830. The congestion message alerts the IPS 120 that the amount of packet flows that will be transmitted to the IPS 120 is going to change. The congestion messages with a load status exchanged between the IPS 120 and switch 110 can be exchanged periodically during the status report of Step 320.

Returning to Step 810, if the switch 110 determines the current capacity of the IPS 120 does not exceed a certain threshold, then in Step 820, the switch 110 will determine whether the current capacity of the IPS 120 is less than a certain threshold. As discussed above, the threshold can be a predefined value, but in this case, the value indicates that the IPS 120 has the ability to handle more network data traffic. If the switch 110 determines that the current capacity of the IPS 120 is not less than a certain threshold in Step 820, the control processor on the switch 110 will continue to monitor the level of traffic being passed to the IPS 120 in Step 805. However, if in Step 820, the switch 110 determines that the current capacity of the IPS 120 is less than a certain threshold, it will lower the value of the Global Interest Priority in Step 825. Subsequently, the switch 110 will also transmit a congestion message to the IPS 120 concerning the change in the traffic load in Step 830.

Figure 9:
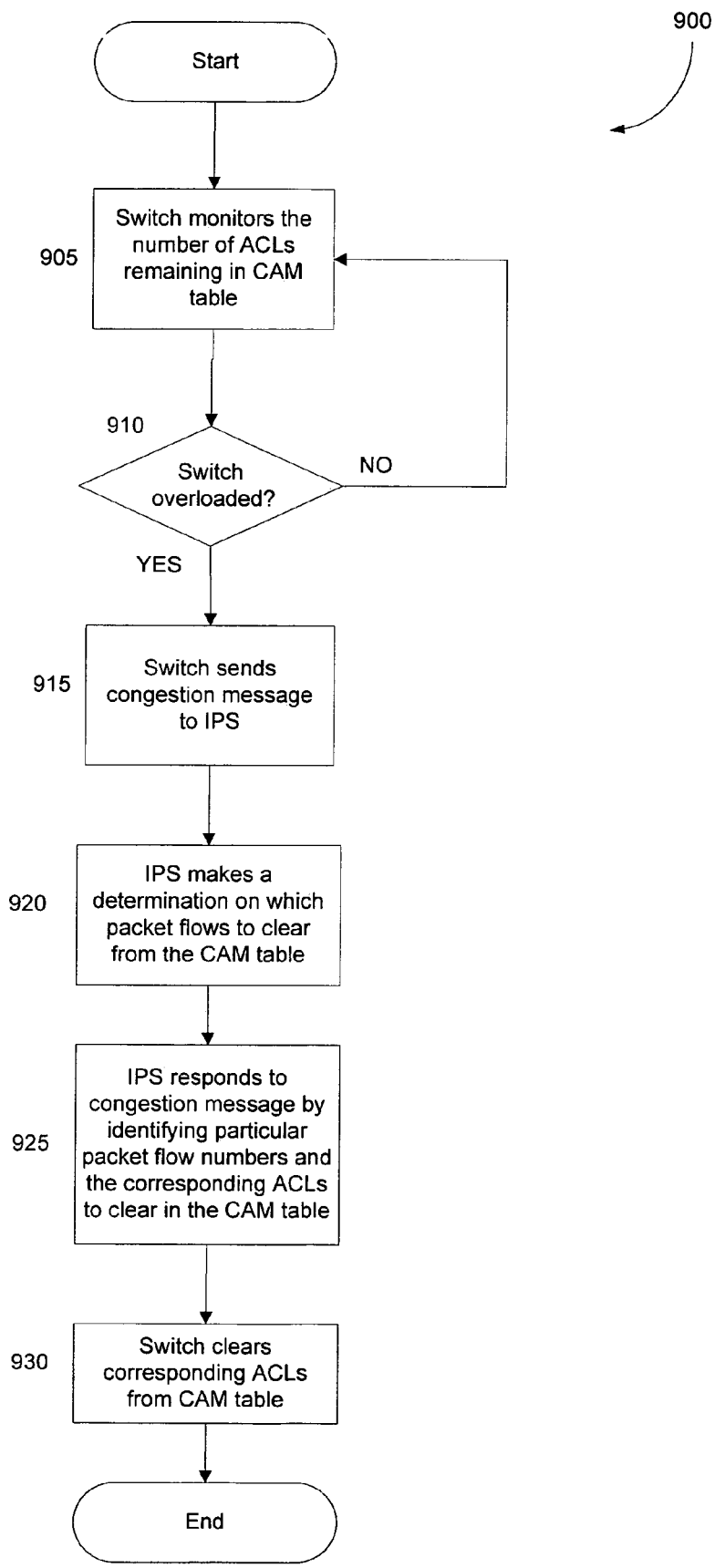
FIG. 9 is a flow chart depicting a method for a switch to monitor and prevent itself from becoming overloaded in accordance with an exemplary embodiment of the invention.

As discussed in reference to FIGS. 8 and 9, the switch 110 or IPS 120 can monitor and adjust the amount of network data traffic that is being transmitted to the IPS 120 from the switch 110 to possibly prevent the IPS 120 from becoming too overloaded. However, it is also a possibility that the switch 110 can become too congested when the CAM table 135 on the switch 110 begins to reach its maximum capacity of ACLs. FIG. 9 is a flow chart depicting a method for a switch to monitor and prevent itself from becoming overloaded in accordance with an exemplary embodiment of the invention. In Step 905, the switch 110 monitors the number of remaining ACLs in the CAM Table 135. In Step 910, the switch 110 determines whether the switch 110 has become too overloaded based on the number of ACLs remaining in the CAM Table 135 being below a threshold value. The threshold value can be a predefined value based many different factors including the specifications of the switch 110 in the system 100, historical information about the switch's 110 capacity, or other values contemplated by the operator of the system 100.

If the switch 110 determines that the number of ACLs remaining in the CAM Table 135 is above a threshold value in Step 910, the switch 110 will continue to monitor the number of remaining ACLs in the CAM Table 135 in Step 905. However, if the switch 110 determines that the number of ACLs remaining in the CAM Table 135 is below a threshold value in Step 910, the switch 110 sends a congestion message notifying the IPS 120 that all the ACLs on the switch 110 or on a particular port of the switch 110 are consumed in Step 915. As part of the congestion message, the switch 110 also sends a list of potential packet flows that can be cleared from the CAM table 135.

In Step 920, and in response to the congestion message received from the switch 110, the IPS 120 can make a determination on which packet flows to clear from the CAM table 135. In an exemplary embodiment, the IPS 120 can clear the packet flows by generating a TCP reset and transmitting it to the source and destination address. The transmission of the TCP reset causes the connection between the switch and the source and destination addresses to be terminated so additional packets will not be received from that particular source address or transmitted to that particular destination address. Subsequently, in Step 925, the IPS 120 responds to the congestion message by identifying particular packet flow numbers to clear from the CAM table 135. The IPS 120 has the security intelligence to make the determination about which ACLs in the CAM table 135 should be cleared. Finally, in Step 930, the switch 110 clears the ACLs corresponding to the packet flow numbers received from the IPS 120, from the CAM table 135.

The system 100 may also face a situation where there is a complete switch 110 failure. When a switch 110 fails it subsequently loses all the ACLs maintained in the CAM table 135. Therefore, to overcome this, the IPS 120 must revert to a fresh state and start the process of initialing analyzing new packet flows and transmitting this information back to the switch 110 in order to store the information in the CAM table 135.

Figure 10:
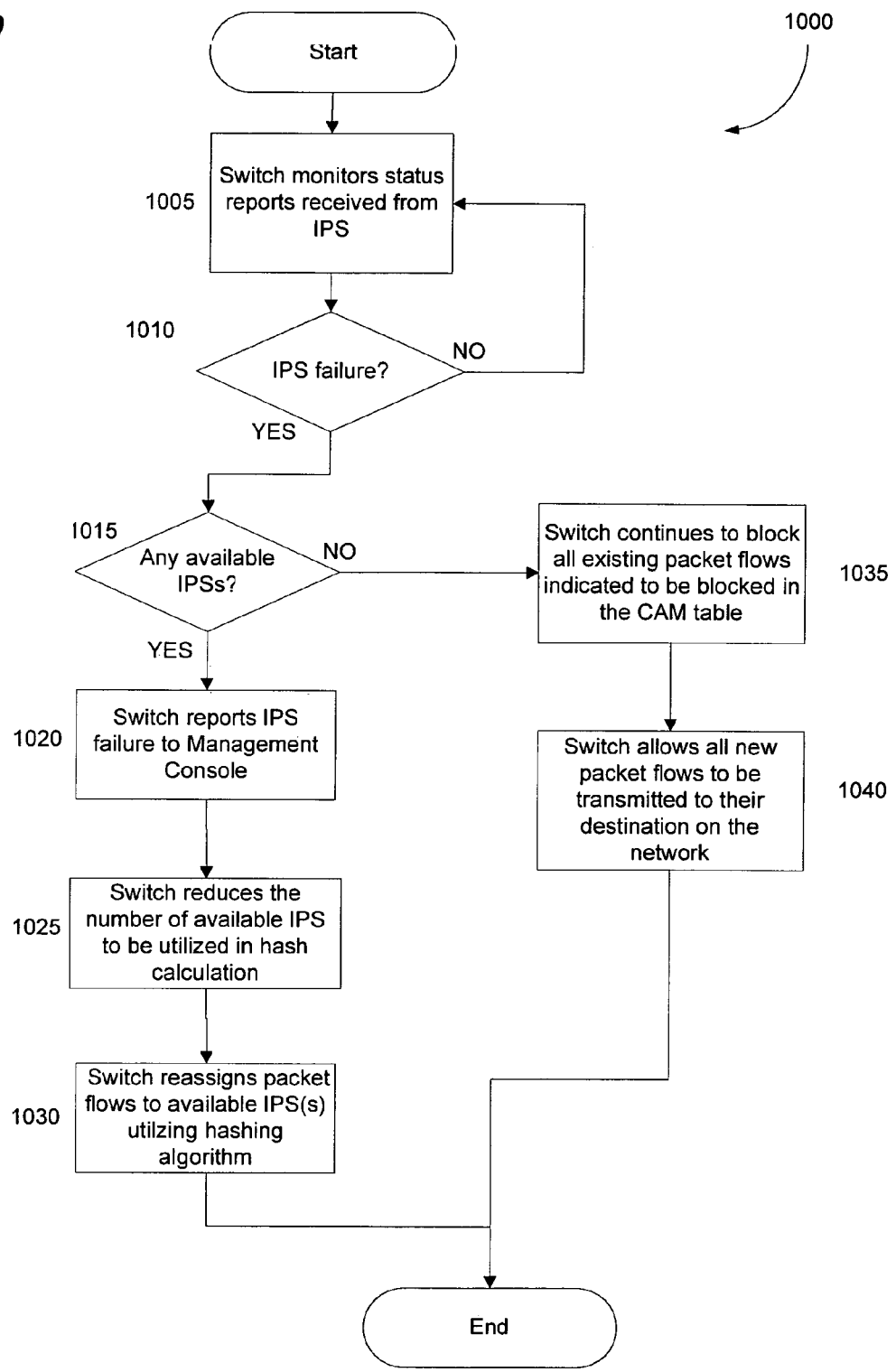
FIG. 10 is a flow chart depicting a method for rebalancing traffic flows over a subset of the original IPSs in an IPS failure scenario in accordance with an exemplary embodiment of the invention.

Another potential problem that the system 100 may face is that a particular IPS 120 that already has packet flows assigned to it, could fail at anytime; and therefore, the system 100 must determine a way to re-route the packet flows until the failed IPS 120 can come back on-line. FIG. 10 is a flow chart depicting a method for rebalancing traffic flows over a subset of the original IPSs in an IPS failure scenario in accordance with an exemplary embodiment of the invention. In Step 1005 the switch will monitor the status reports which it periodically receives from the IPSs 120 in Step 320. In Step 1010 the switch 110 will determine whether there has been an IPS 120 failure. The switch 110 can recognize an IPS 120 failure when either it does not receive a periodic status report from one or more of the IPS 120 or the switch 110 observes that the number of packets that it transmits to the IPS 120 is not equivalent to the number of packets it receives back from the IPS 120. If the switch 110 determines that there has not been an IPS 120 failure in Step 1010, the switch 110 will continue to monitor the status reports received from the IPSs 120 in Step 1005.

In Step 1010, if the switch 110 determines that there has been an IPS 120 failure, the switch 110 will then determine whether there are any IPS 120 available to analyze packet flows in the system 100 in Step 1015. If the switch 110 determines there are other IPS 120 available in the system in Step 1015, the switch 110 will first report the IPS 120 failure to the Management Console 165 in Step 1020. Next, the switch 110 will reduce the number of available IPS 120 in the system 100 to correctly represent the number of IPS 120 that are available to analyze packet flows in Step 1025. The number of available IPS 120 in the system 100 will be utilized by the switch 110 in performing the hashing algorithm in Step 1030. In Step 1030, the switch 110 dynamically reassigns the packet flows of the failed IPS(s) 120 across the available IPS(s) 120 utilizing the load balancing hashing algorithm, which is implemented on the switch 110. Furthermore, any new packet flows received by the switch 110 will only be assigned to the available IPS(s) 120. An exemplary method for evenly distributing packet flows with a switch 110 among one or more IPS 120 through a load balancing hashing algorithm is discussed above in reference to FIG. 6.

By way of example only, if there are four IPSs 120 operating in the system 100 and one of them fails, the switch 110, utilizing the hashing algorithm, will evenly distribute the packet flows from the one failed IPS 120 across the remaining three IPS 120 that are still operating normally.

Returning to Step 1015, if the switch determines that there are no available IPS 120 in the system 100, the process will move to Step 1035. In Step 1035, in a situation where the system 100 encounters a complete failure of all of the IPSs 120, the switch 110 will continue to block all existing packet flows that were indicated to be blocked in the CAM table 135. Furthermore, in Step 1040, the switch 110 will allow all new packet flows it receives to be transmitted to its corresponding destination on the network 115.

Figure 11:
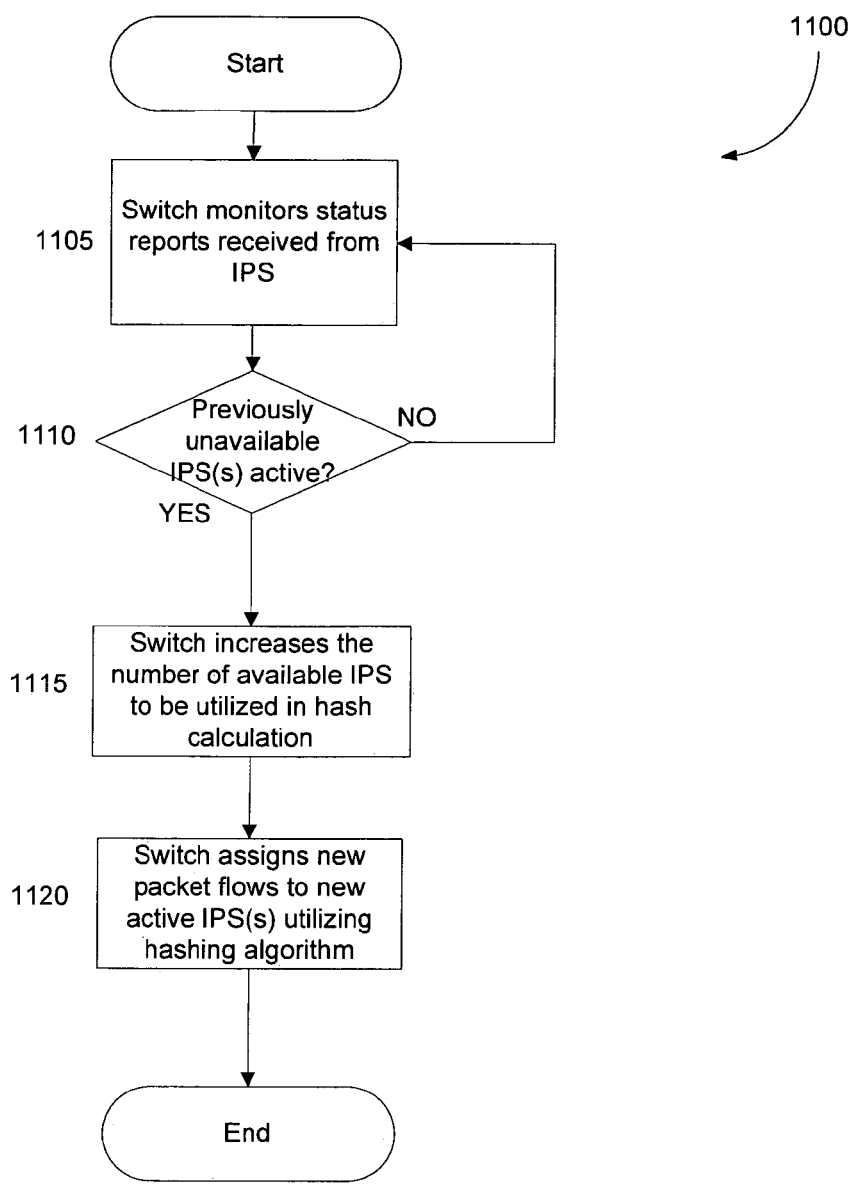
FIG. 11 is a flow chart depicting a method for distributing traffic flows to an IPS that becomes active in accordance with an exemplary embodiment of the invention.

FIG. 11 is a flow chart depicting a method for distributing traffic flows to an IPS that becomes active in accordance with an exemplary embodiment of the invention. This figure describes situations where new IPS(s) 120 are connected to the switch 110 in the system 100 and situations where an IPS 120 that previously failed has become active again and is available to analyze packet flows. In Step 1105 the switch 110 will monitor the status reports which it periodically receives from the IPSs 120 in Step 320. In Step 1010 the switch 110 will determine whether a previously unavailable IPS 120 has become active and available to analyze packet flows. The switch 110 can recognize an active IPS 120 when it receives a status report about one or more IPS 120 becoming available as discussed in Step 320. If the switch 110 determines that there is not a previously unavailable IPS 120 that has become active and available to analyze packet flows in Step 1010, the switch 110 will continue to monitor the status reports received from IPSs 120 in Step 1105.

However, if the switch 110 determines that a previously unavailable IPS 120 has become active and available to analyze packet flows in Step 1010, the switch 110 will first increase the number of available IPS 120 in the system 100 to correctly represent the number of IPS 120 that are available to analyze packet flows in Step 1115. The number of available IPS 120 in the system 100 will be utilized by the switch 110 in performing the hashing algorithm in Step 1120. Subsequently, in Step 1120, the switch 110 will assign new packet flows to the IPS 120 that has become active, utilizing a load balancing hashing algorithm, which is implemented on the switch 110. Packet flows that were previously reassigned to a new IPS 120 following the failure of an IPS 120 will continue to be transmitted to their current assigned IPS 120.

It should be understood that the foregoing relates only to illustrative embodiments of the present invention, and that numerous changes may be made therein without departing from the scope and spirit of the invention as defined by the following claims.

The invention claimed is:

1. A computer-implemented method for providing intrusion protection for a unique packet flow of network data traffic, comprising the steps of:
    receiving at a switch a first portion of the unique packet flow; transmitting a congestion message to an intrusion prevention system in response to a table of packet flow information on the switch approaching its maximum capacity and transmitting a list of one or more packet flows to the intrusion prevention system that can be deleted from the table;
    determining at the switch whether a second portion of the unique packet flow has previously been received at the switch;
    in response to determining that the second portion of the unique packet flow has not been received at the switch, analyzing the first portion of the unique packet flow at the intrusion prevention system; and
    in response to determining that the second portion of the unique packet flow has been received at the switch, checking a value of a single status field corresponding to the unique packet flow, and based on the value, performing one of:
        blocking the first portion of the unique packet flow at the switch without communicating information relating to the unique packet flow to a security device; and
        transmitting the first portion of the unique packet flow from the switch to its intended destination without communicating information relating to the unique packet flow to the security device.

2. The method of claim 1, wherein the step of determining whether the second portion of the unique packet flow has previously been received at the switch further comprises the step of comparing packet flow information relating to the first portion of the unique packet flow to a plurality of packet flow information entries in a table corresponding to a plurality of previously received packet flows.

3. The method of claim 2, wherein the step of comparing the packet flow information further comprises determining whether a source IP address, a destination IP address, a source port, a destination port, a layer-4 protocol, and a VLAN tag for the first portion of the unique packet flow matches a source IP address, a destination IP address, a source port, a destination port, a layer-4 protocol, and a VLAN tag for one of the plurality of packet flow information entries in the table corresponding to one of the plurality of previously received packet flows.

4. The method of claim 1, further comprising a plurality of intrusion prevention systems, wherein the step of analyzing the first portion of the unique packet flow at an intrusion prevention system in response to determining that the second portion of the unique packet flow has not been received at the switch, further comprises the steps of:
    assigning the unique packet flow to one of the plurality of intrusion prevention systems;
    assigning a packet flow number to the unique packet flow;
    gathering packet flow information for the first portion of the unique packet flow;
    determining whether the first portion of the unique packet flow contains a security violation; and
    assigning a status value to the unique packet flow.

5. The method of claim 4, further comprising the steps of:
    assigning an interest priority value for the unique packet flow; and
    assigning a global interest priority value at the switch.

6. The method of claim 4, wherein the step of assigning the unique packet flow to one of the plurality of intrusion prevention systems, further comprises the steps of:
    creating a hash value for the unique packet flow from the packet flow information;
    dividing the hash value for the unique packet flow by a number equal to the quantity of intrusion preventions systems that are available to analyze the unique packet flow; and
    assigning the unique packet flow with the switch to the intrusion prevention system associated with a remainder value resulting from the step of dividing the hash value.

7. The method of claim 1, further comprising the steps of:
transmitting a flow qualification message relating to the unique packet flow from the intrusion prevention system to a table on the switch;
transmitting the first portion of the unique packet flow from the intrusion prevention system to the switch; and
performing an action on the first portion of the unique packet flow at the switch.

8. The method of claim 7, wherein the step of performing an action on the first portion of the unique packet flow, further comprises one of:
blocking the first portion of the unique packet flow at the switch, and
transmitting the first portion of the unique packet flow from the switch to its intended destination.

9. The method of claim 1, wherein the step of in response to determining that the second portion of the unique packet flow has been received at the switch, further comprises the option of:
analyzing the first portion of the unique packet flow at the intrusion prevention system.

10. The method of claim 9, wherein the step of analyzing the first portion of the unique packet flow at the intrusion prevention system in response to determining that the second portion of the unique packet flow has been received at the switch, further comprises the steps of:
determining whether the first portion of the unique packet flow contains a security violation; and
assigning a status value to the unique packet flow.

11. The method of claim 10, further comprising the steps of:
assigning an interest priority value for the unique packet flow; and
assigning a global priority value at the switch.

12. The method of claim 10, further comprising the steps of:
transmitting a flow qualification message relating to the unique packet flow from the intrusion prevention system to a table on the switch;
transmitting the first portion of the unique packet flow from the intrusion prevention system to the switch; and
performing one of:
blocking the first portion of the unique packet flow at the switch; and
transmitting the first portion of the unique packet flow from the switch to its intended destination.

13. The method of claim 1, further comprising the steps of:
determining which of the one or more packet flows to delete from the table on the switch based on the list of one or more packet flows received from the switch;
transmitting a reset message to a source address and a destination address of the one or more packet flows that the intrusion prevention system has determined to delete; and
transmitting an instruction message to the switch identifying which of the one or more packet flows to delete from the table.

14. The method of claim 1, further comprising the steps of:
monitoring a current capacity of the intrusion prevention system for analyzing traffic flows; and
adjusting a global priority value in response to the current capacity reaching a particular threshold.

15. A system for providing intrusion protection for a unique packet flow of network data traffic, comprising:
a switch operative to:
receive a first portion of the unique packet flow and determine whether a second portion of the unique packet flow has previously been received; transmit a congestion message to an intrusion prevention system in response to a table of packet flow information on the switch approaching its maximum capacity and transmit a list of one or more packet flows to the intrusion prevention system that can be deleted from the table; and
in response to determining that the second portion of the unique packet flow has been received at the switch, check a value of a single status field corresponding to the unique packet flow, and based on the value, perform one of:
block the first portion of the unique packet flow at the switch without communicating information relating to the unique packet flow to a security device; and
transmit the first portion of the unique packet flow from the switch to its intended destination without communicating information relating to the unique packet flow to the security device; and
one or more intrusion prevention systems operative to analyze the first portion of the unique packet flow in response to a determination that the second portion of the unique packet flow has not been previously received at the switch.

16. The system of claim 15, wherein the switch is further operative to determine whether a second portion of the unique packet flow has previously been received by comparing packet flow information relating to the first portion of the unique packet flow to a plurality of packet flow information entries in a table corresponding to a plurality of previously received packet flows.

17. The system of claim 16, wherein the switch is further operative to compare the packet flow information by determining whether a source IP address, a destination IP address, a source port, a destination port, a layer-4 protocol, and a VLAN tag for the first portion of the unique packet flow matches a source IP address, a destination IP address, a source port, a destination port, a layer-4 protocol, and a VLAN tag for one of the plurality of packet flow information entries in the table corresponding to one of the plurality of previously received packet flows.

18. The system of claim 15, wherein the switch is further operative to assign the unique packet flow to one of the intrusion prevention systems.

19. The system of claim 18 wherein the switch is further operative to assigning the unique packet flow to one of the plurality of intrusion prevention systems by:
creating a hash value for the unique packet flow from the packet flow information;
dividing the hash value for the unique packet flow by a number equal to the quantity of intrusion preventions systems that are available to analyze the unique packet flow; and
assigning the unique packet flow to one of the plurality of intrusion prevention systems associated with the remainder value from the step of dividing the hash value.

20. The system of claim 15, wherein the one or more intrusion prevention systems are further operative to analyze the first portion of the unique packet flow in response to determining that the second portion of the unique packet flow has not been received at the switch by:
assigning a packet flow number to the unique packet flow;
gathering packet flow information for the first portion of the unique packet flow;

determining whether the first portion of the unique packet flow contains a security violation; and assigning a status value to the unique packet flow.

21. The system of claim 20, wherein the intrusion prevention system is further operative to:

assign an interest priority value for the unique packet flow; and assign a global priority value at the switch.

22. The system of claim 15, wherein the intrusion prevention system is further operative to:

transmit a flow qualification message relating to the unique packet flow to a table on the switch; and transmit the first portion of the unique packet flow to the switch.

23. The system of claim 15, wherein the switch is further operative to perform an action on the first portion of the unique packet flow.

24. The system of claim 23, wherein the switch is further operative to perform an action on the first portion of the unique packet flow by:

blocking the first portion of the unique packet flow, and transmitting the first portion of the unique packet flow to its intended destination.

25. The system of claim 15, wherein in response to a determination that the second portion of the unique packet flow has been previously received at the switch, the switch is further operative to:

transmit the first portion of the unique packet flow to the intrusion prevention system for analysis.

26. The system of claim 25, wherein the intrusion prevention system is further operative to analyze the first portion of the unique packet flow in response to the determination that the second portion of the unique packet flow has been previously received at the switch by:

determining whether the first portion of the unique packet flow contains a security violation; and assigning a status value to the unique packet flow.

27. The system of claim 26, wherein the intrusion prevention system is further operative to:

assign an interest priority value for the unique packet flow; and assign a global priority value at the switch.

28. The system of claim 26, wherein the intrusion prevention system is further operative to:

transmit a flow qualification message relating to the unique packet flow to a table on the switch; and transmit the first portion of the unique packet flow to the switch.

29. The system of claim 26, wherein the switch is further operative to perform one of:

blocking the first portion of the unique packet flow; and transmitting the first portion of the unique packet flow to its intended destination.

30. The system of claim 15, wherein the intrusion prevention system is operative to:

determine which of the one or more packet flows to delete from the table on the switch based on the list of one or more packet flows received from the switch;

transmit a reset message to a source address and a destination address of the one or more packet flows that the intrusion prevention system has determined to delete; and transmit an instruction message to the switch identifying which of the one or more packet flows to delete from the table.

31. The system of claim 15, wherein the intrusion prevention system is further operative to:

monitor its current capacity for analyzing traffic flows;

adjust a global priority value in response to the current capacity reaching a particular threshold; and transmit the global priority value to the switch.

32. The system of claim 15, wherein the switch is further operative to:

monitor a traffic flow ratio of the intrusion prevention system; and adjust a global priority value in response to the traffic flow ratio of the intrusion prevention system reaching a particular threshold.

* * * * *